(12) United States Patent
Sethi et al.

(10) Patent No.: US 11,128,492 B2
(45) Date of Patent: Sep. 21, 2021

(54) AUTOMATED GATEWAY SELECTION IN SD-WAN

(71) Applicant: Hewlett Packard Enterprise Development LP, Houston, TX (US)

(72) Inventors: Aseem Sethi, Bangalore (IN); Manoj Wagle, Bangalore (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 352 days.

(21) Appl. No.: 16/385,299

(22) Filed: Apr. 16, 2019

(65) Prior Publication Data

US 2020/0336336 A1 Oct. 22, 2020

(51) Int. Cl.
*H04L 12/66* (2006.01)

(52) U.S. Cl.
CPC .................... *H04L 12/66* (2013.01)

(58) Field of Classification Search
CPC ....................................... H04L 12/66
USPC .......................................... 370/395
See application file for complete search history.

(56) References Cited

U.S. PATENT DOCUMENTS

| | | | |
|---|---|---|---|
| 8,908,698 B2 | 12/2014 | Aguayo et al. | |
| 9,438,564 B1 | 9/2016 | Weng et al. | |
| 2004/0202111 A1* | 10/2004 | Beshai | H04L 45/00 370/237 |
| 2015/0007272 A1 | 1/2015 | Zou | |
| 2015/0249644 A1 | 9/2015 | Xu | |
| 2015/0333965 A1* | 11/2015 | Lee | H04L 41/12 370/254 |
| 2016/0381155 A1* | 12/2016 | Pan | H04L 61/609 709/221 |
| 2018/0013636 A1 | 1/2018 | Seetharamaiah et al. | |
| 2020/0252234 A1* | 8/2020 | Ramamoorthi | H04L 45/64 |

OTHER PUBLICATIONS

Aruba SD-branch Overview, Jun. 2018, pp. 1-11, Retrieved from the Internet on Sep. 14, 2018 at URL: <arubanetworks.com/assets/wp/WP_SDBranchOverview.pdf>.

(Continued)

*Primary Examiner* — Ricky Q Ngo
*Assistant Examiner* — Ellen A Kirillova
(74) *Attorney, Agent, or Firm* — Hewlett Packard Enterprise Patent Department (57) ABSTRACT

An example network orchestrator includes processing circuitry and memory. Instructions of the memory, when executed by the processing circuitry, cause the network orchestrator to receive an indication that a branch gateway has joined a SD-WAN. The instructions further cause the network orchestrator to determine, based on parameters of the branch gateway, a geographic location of the branch gateway. The instructions further cause the network orchestrator to select a set of headend gateways located in a region including the geographic location of the branch gateway. The instructions further cause the network orchestrator to calculate a suitability score for each headend gateway based on the geographic location of the branch gateway in comparison to a geographic location of the each headend gateway. The instructions further cause the network orchestrator to assign the branch gateway to a headend gateway of the set of headend gateways with an optimal suitability score.

20 Claims, 4 Drawing Sheets

(56) References Cited

OTHER PUBLICATIONS

Cisco Meraki Auto VPN, Jul. 2013, pp. 1-8 (online), Retrieved from the Internet Sep. 14, 2018 at URL: <meraki.cisco.com/lib/pdf/meraki_whitepaper_autovpn.pdf>.

Steelconnect in the Cloud, pp. 1-1 (online), Retrieved from the Internet on Sep. 14, 2018 at URL: <support.riverbed.com/bin/support/static/drr5abac55gjf3t2ouklprib2p/html/3g9d2i72jnt89410rhhtjrpc5h/sc_ug_html/index.html#page/sc_ug/cloud_aws_azure.html>.

* cited by examiner

AUTOMATED GATEWAY SELECTION IN SD-WAN

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to from the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

In many SD-WANs, initial configuration of a branch site (or, possibly, a core site) can be labor intensive, as many components are configured and many layers of protocols, services, and routes are defined.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

certain examples have features that are in addition to or in lieu of the features illustrated in the above-referenced figures. Certain labels may be omitted from certain figures for the sake of clarity.

DETAILED DESCRIPTION

During initialization of a software driven wide area network (SD-WAN) or a site within the SD-WAN, initial configuration may include assignment of the site gateway (e.g. branch gateway) to a specific gateway (e.g. headend gateway) of a core site. In some SD-WANs, core sites, such as datacenters and headquarters may have multiple headend gateways around the world that provide access to the core site. This is often true for cloud-based services provided to corporate networks, such as in hybrid cloud deployments. Often, a network administrator manually assigns a certain headend gateway to the branch gateway.

Each branch gateway (BG) may have multiple candidate headend gateways (HGs) that may potentially allow for the fastest, most stable connection between sites. For example, a BG in Oakland, Calif. may have the option to connect to HGs in Tokyo, Japan, Delhi, India, Berlin, Germany, Seattle Wash., Los Angeles, Calif., and Vancouver, Canada. Although it is theoretically possible that the Tokyo, Delhi, or Berlin HGs could provide the best connection between sites, this is highly unlikely. It is much more likely that the best connection will exist between the BG and a HG in a same geographic region as the BG. For example, a western North America region including the Seattle, Los Angeles, and Vancouver HGs would also include the Oakland branch.

In manually configured SD-WANs, a network administrator may determine that the Los Angeles HG is the nearest, so the Davis branch should be assigned to the Los Angeles HG. However, it is possible, due to network topology, dynamic network conditions, and other factors, that a connection between the Oakland branch and the Seattle HG or the Oakland branch and the Vancouver HG is better than the Oakland ↔ Los Angeles connection.

A network orchestrator can be used to intelligently and automatically connect branches with a HG that is best suited to provide a fast, stable connection between the core site and the branch. The network orchestrator is notified when a new site joins the SD-WAN. For example, if a new HG joins the network, the network orchestrator receives identifying information from the HG. Similarly, if a new BG joins the network, the network orchestrator receives identifying information from the BG. The identifying information may include information such as a device serial number, component serial number, public IP address, MAC address, device type, device software version, etc. The network orchestrator may be able to access a service that determines a geographic location for a HG or BG based on the identifying information. For example, the network orchestrator may transmit the public IP address to the location determination service and receive back a latitude, longitude, and geographical region. In another example, the network orchestrator determines the geographical region from the latitude and longitude. In some examples, the location determination service is provided by the internet service provider (ISP) of the HG or BG. In some other examples, the location determination service is a subscription service provided to the network orchestrator. In yet other examples, the location determination service is a cloud service collocated with the network orchestrator or elsewhere on the SD-WAN. In yet other examples, BGs and HGs may be able to directly determine their own geographic location through various means, including querying an ISP service or using GPS.

The network orchestrator may then transmit updated software, configuration commands, and commands for the HG or BG to send monitoring information to the network orchestrator periodically. HGs, for example, may send gateway health information including CPU usage, memory usage, per-application metrics, network interface capacity, network interface load, etc. BGs, for example, may send information including link health information for links between the BG and each HG in the BG's geographical region, such as latency, jitter, and packet loss.

When a new BG joins the SD-WAN, the network orchestrator uses the determined geographic location of the BG to select a group of HGs collocated in the same geographic region. The group of HGs may be communicated to the BG so that the BG can measure link health between itself and each of the group of HGs. The BG may measure link health by any appropriate method, including periodically sending probes across each respective link.

The network orchestrator then determines a suitability score for each HG relative to the BG. The suitability score may include multiple factors each weighted based on importance. In some examples, the suitability score is directly correlated with suitability to host the BG, such that a higher suitability score corresponds to a greater suitability. In some other examples, the suitability score is inversely correlated with suitability to host the BG, such that a lower suitability score corresponds to a greater suitability. For example, the network orchestrator may include parameters that contribute to HG load and capacity, parameters that contribute to link health between the BG and the HG, expected bandwidth requirements for the BG, geographic distance, etc. Each parameter may have a corresponding weight depending on the parameter's importance in determining suitability.

The network orchestrator may, over time, adjust the weight of each parameter to better assign HGs to BGs. A network administrator may be able to adjust individual weights to alter the suitability score to account for the corresponding parameter more or less. Additionally, for example, the network orchestrator may determine, using a machine learning algorithm, that certain parameters correspond to a high quality site-to-site link more than other parameters. For instance, in a SD-WAN where connectivity is limited not by the hardware of the SD-WAN, but by the intervening Internet links, link health parameters may be weighted more heavily than in SD-WANs where connectivity is limited by the available capacity of each HG.

The network orchestrator may also, for example, alter the weights of the suitability score depending on the type of branch that is being added to the network. For instance, a branch created for a new regional headquarters may be relatively insensitive to individual link constraints due to having multiple redundant links across the SD-WAN. However, the regional headquarters branch may be relatively sensitive to HG available capacity due to the large amount of bandwidth used by the large number of client devices. In contrast, a microbranch for a single client device may be relatively sensitive to individual link constraints because the microbranch has no link redundancy. The microbranch may be relatively insensitive to HG available capacity due to the small amount of bandwidth used by the single client device.

The network orchestrator may calculate a suitability score for the regional headquarters using a set of weights that emphasizes available capacity on each HG. The network orchestrator may then calculate a suitability score for the microbranch using a set of weights that emphasizes link health between the BG and each HG.

Once the network orchestrator calculates suitability scores for each HG in the geographic region of the BG, the network orchestrators ranks the HGs based on their suitability scores. Once the HGs are ranked, the network orchestrator can take many actions, including presenting the ranked list to a network administrator for manual assignment of the BG to the HG and automatically assigning the BG to the most suitable HG.

Although a BG may be assigned to a most suitable HG at the time that the BG is added to the SD-WAN, but changing network conditions, including addition of more HGs and more branches may cause the assigned HG to no longer be the most suitable for the BG. The network orchestrator may periodically survey the SD-WAN and determine whether reassigning certain BGs to different HGs will improve overall SD-WAN performance. For example, the network orchestrator may recalculate suitability scores for all HGs in the geographical region of the BG and if a different HG's suitability score is better than the current HG by at least a threshold value, the network orchestrator may send commands to the SD-WAN to reassign the BG to the different HG. The threshold value may prevent the BG from flopping between multiple similarly suitable HGs.

Figure 1:
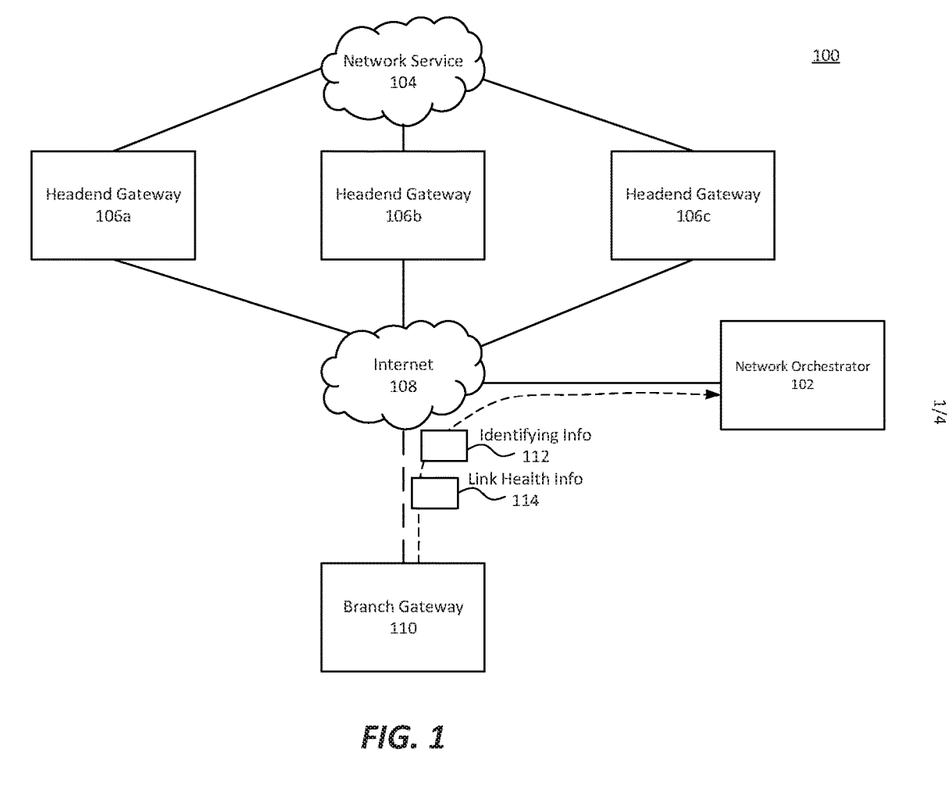
FIG. 1 illustrates an example software defined wide area network (SD-WAN) with automated gateway selection.

FIG. 1 illustrates an example software defined wide area network (SD-WAN) with automated gateway selection. SD-WAN 100 includes a network orchestrator 102, a network service 104, headend gateways (HGs) 106, Internet 108, and branch gateway (BG) 110. Network orchestrator 102 orchestrates the interconnections between sites of SD-WAN 110, including the branch controlled by branch gateway 110 and the core site that hosts network service 104.

There are many methods for initializing sites on SD-WAN 100, but for the purposes of this disclosure, the different methods are contemplated and do not alter the features of this disclosure. An example method is described merely to provide context, but this disclosure is not limited to this specific example initialization method.

As an example, an organization may purchase a branch gateway 110 from a manufacturer. The manufacture may then associate a device serial number and device MAC address of branch gateway 110 with the organization. Network orchestrator 102 may be hosted by the manufacturer as a cloud service. Upon initialization, branch gateway 110 connects to an initialization service using an URL programmed into branch gateway 110 during manufacture. Branch gateway 110 forwards identifying information 112. The initialization service is associated with network orchestrator 102. Due to the dynamic nature of cloud hosted services, the initialization service may execute on the same physical device as network orchestrator 102, on a different physical device than network orchestrator 102, or any number of physical devices, some of which also execute network orchestrator 102. In certain examples, the initialization service is a component of network orchestrator 102. No matter the physical topology of the manufacturer's cloud services, the initialization service and network orchestrator 102 can communicate with one another.

Based on initialization policies configured by a network administrator, branch gateway 110 is identified as a branch gateway. Network orchestrator 102 extracts certain parts of the identifying information 112, such as a public IP address. From the extracted identifying information, network orchestrator 102 can determine a geographic location of branch gateway 110. The location can be determined in one of many ways, including directly by branch gateway 110 and included in identifying info 112, by transmitting the extracted identifying information to a location determination service, by determining a geographic location by looking up a public IP in a geographic database, etc. The geographic location may take one of many forms, including nearest metropolitan area, latitude and longitude, legal jurisdiction, etc. The geographic location may also include a geographic region, such as a continental region (e.g. North America) or a subdivision of a continental region (e.g. Western North America). The geographic region may, in some examples, be provided by the location determination service. In some other examples, the geographic region may be determined by network orchestrator 102 using received geographic location information.

Similarly when a headend gateway (HG) 106 is added to SD-WAN 100, a geographic location is determined for the HG 106. In a common SD-WAN topology, multiple HGs 106 may be deployed across the world to connect other sites to a network service 104. This topology applies both to services 104 provided from a core site (e.g. a datacenter) and to cloud services 104 from a cloud provider. For example, HG 106a may be in Beijing, China, HG 106b may be in Brussels, Belgium, and HG 106c may be in Denver, Colo. Network orchestrator 102 determines location information in a similar way as described in relation to BGs, and determines geographic regions based on the geographic locations similarly to the methods described in relation to BGs. For example, HG 106a may be in an East Asia region, HG 106b may be in a Europe region, and HG 106c may be in a Western North America region. Network orchestrator 102 then retains the location information for each HG 106.

When a BG 110 initializes on SD-WAN 100 and its geographical location is determined, network orchestrator 102 creates a preliminary list of HGs 106 that are collocated with BG 110 in the same geographic region. For example, if BG 110 is located in Phoenix, Ariz., then HG 106a is collocated with BG 110 in the Western North America region. However, there may be multiple HGs 106 in a geographical region. For example, if HG 106a is in Denver, Colo., HG 106b is in Seattle, Wash., and HG 106c is in San Jose, Calif., then BG 110 may be collocated with all three HGs 106 in the Western North America region.

Once the preliminary list of HGs 106 is generated for BG 110, the list is forwarded to BG 110, and BG 110 collects information about the links between BG 110 and each HG 106 on the list. BG 110 may send probes, such as ICMP probes to each HG 106 and collect information such as latency, jitter, packets dropped, etc. from the probes. BG 110 then forwards link health info 114 to network orchestrator 102. Since each link between BG 110 and HGs 106 passes through Internet 108, it is possible that a geographically more distant link (e.g. Phoenix to Seattle) is better suited to the branch's needs than a geographically nearer link (e.g. Phoenix to Denver).

Network orchestrator 102 collects periodic information from each HG 106 including information about the HG's available capacity. Even in situations where the intervening link (passing through Internet 108) between BG 110 and a HG 106a is more suitable than an intervening link between BG 110 and another HG 106b, HG 106a may be less capable of handling the bandwidth requirements of the branch associated with BG 110 than HG 106b. For example, if HG 106a has a total throughput capacity of 10 Gbps and has 5% available capacity (available capacity of 500 Mbps), it is not well suited for a BG 110 with a 750 Mbps requirement. Whereas, if HG 106b has a total throughput capacity of 1 Gbps and has 95% available capacity (available capacity of 950 Mbps), it may be more well suited for the BG 110's 750 Mbps requirement. In some other examples, network orchestrator 102 may take HG 106 available capacity into account in the suitability score without receiving an expected bandwidth demand from BG 110.

Once suitability scores are determined for each HG 106 in relation to BG 110, the HGs 106 are ranked. For example, if HG 106a has a suitability score of 14.26, HG 106b has a suitability score of 12.18, and HG 106c has a suitability score of 17.91, and if a lower suitability score corresponds to a more suitable HG, then the HGs may be ranked as follows. HG 106b ranked first, HG 106a ranked second, HG 106c ranked third.

Once the HGs 106 are ranked, network orchestrator 102 may do one of many things. In some examples, network orchestrator 102 selects the first ranked HG 106b and transmits commands to SD-WAN 100 to assign BG 110 to HG 106b. In some other examples, network orchestrator 102 presents the ranked list of HGs 106 to a network administrator, who chooses which HG 106 to assign BG 110 to.

Figure 2:
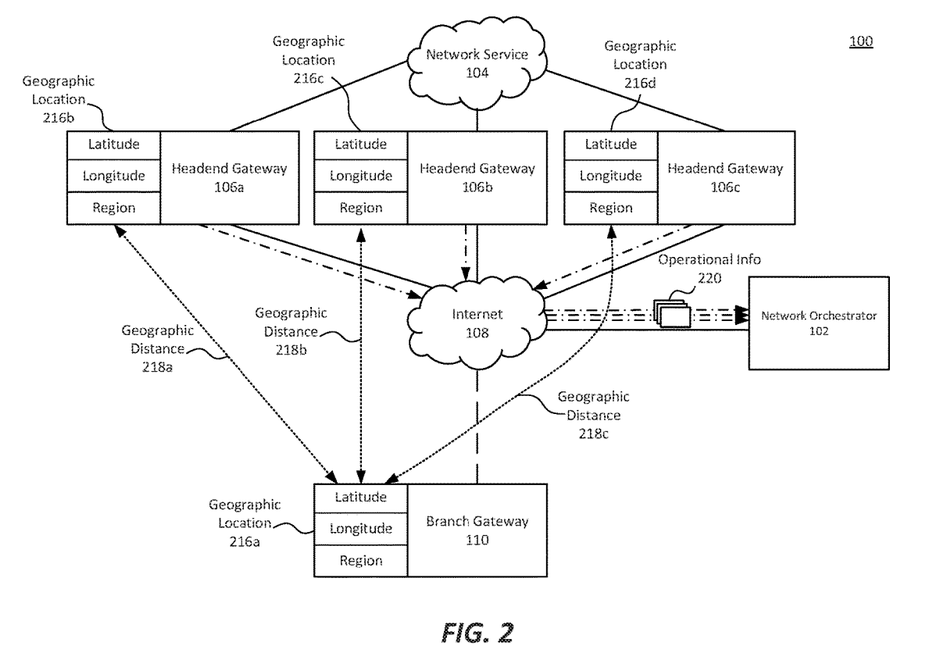
FIG. 2 illustrates an example software defined wide area network (SD-WAN) with automated gateway selection based, in part, on geographic location.

FIG. 2 illustrates an example software defined wide area network (SD-WAN) with automated gateway selection based, in part, on geographic location. As discussed in relation to FIG. 1, SD-WAN 100 may include multiple HGs 106 that provide access to network service 104. Network orchestrator 102 uses, among other factors, geographic locations 216 of BG 110 and HGs 106 when determining which HG 106 to assign BG 110 to. As an example, when each HG 106 joins SD-WAN 100, network orchestrator 102 receives identifying information, including a public IP address for the HG 106. Network orchestrator 102 forwards the public IP address to a location determination service, which returns a geographic location 216 for the HG 106. The geographic location 216 may include location information in any form. For example, geographic location 216 may include latitude, longitude and a geographic region.

Network orchestrator 102 may also send commands to SD-WAN 100 to periodically receive operational information 220 from each HG 106. Operational information 220 may include information about available capacity of each HG 106, as previously discussed.

When a new BG 110 joins SD-WAN 100, network orchestrator 102 determines a geographic location 216a for BG 110, and generates a list of HGs 106 located in the same geographic region as BG 110. For each HG 106 in the list, network orchestrator 102 determines a geographic distance 218 between the respective HG 106 and BG 110. For example, for HG 106a, network orchestrator 102 determines geographic distance 218a between geographic location 216b and geographic location 216a.

Then, network orchestrator 102 determines suitability scores for each HG 106 on the list, based on parameters including geographic distances 218, operational info 220, and link health info (not shown).

Figure 3:
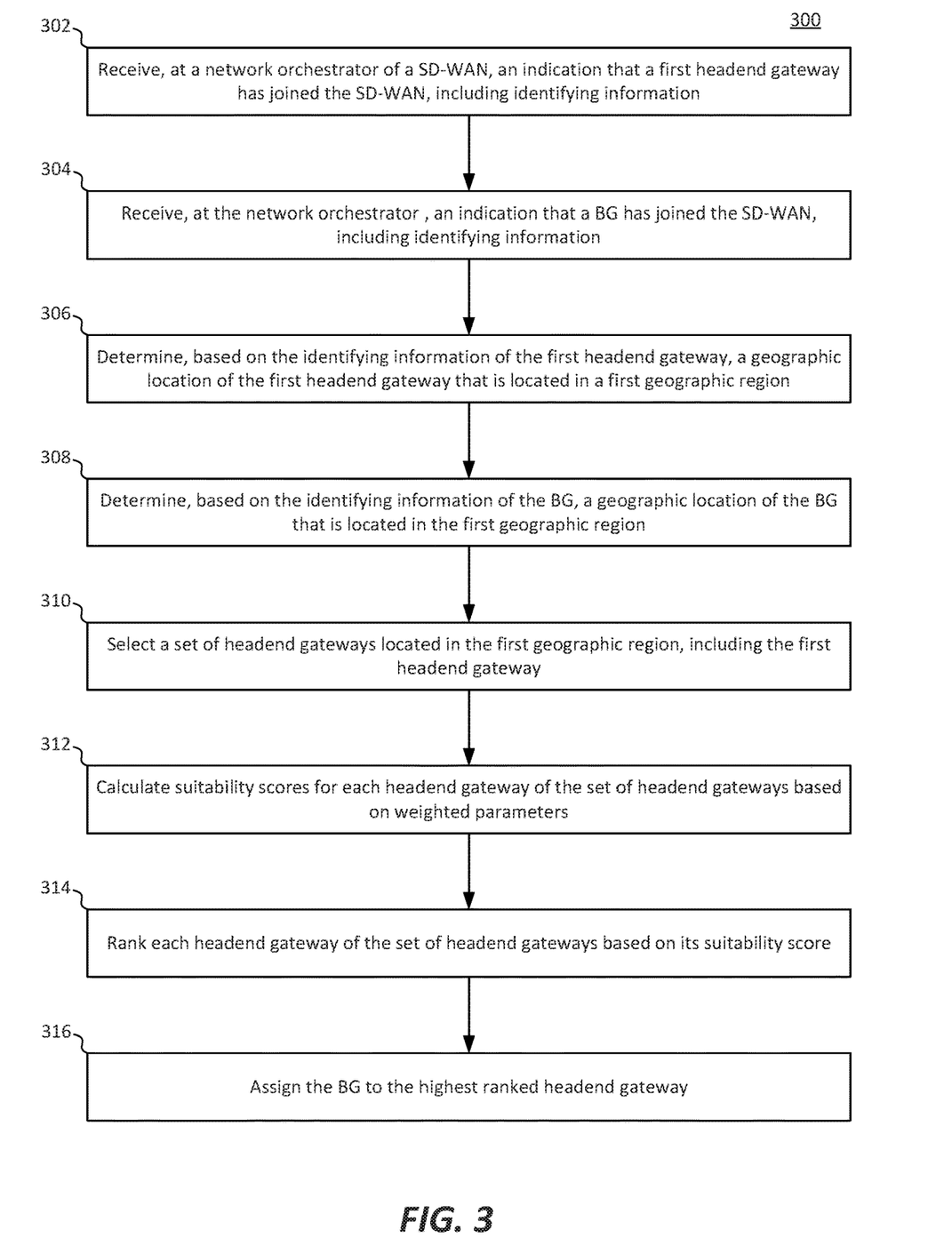
FIG. 3 is a flowchart illustrating an example method for automatic gateway selection.

FIG. 3 is a flowchart illustrating an example method 300 for automatic gateway selection. Method 300 may, for example, be executed by a network orchestrator service provided from cloud devices.

In block 302, an indication is received at a network orchestrator of a SD-WAN that a first headend gateway has joined the SD-WAN, including identifying information. In some examples, the identifying information includes a public IP address of the first headend gateway. The indication may be transmitted to the network orchestrator by an initialization service that is communicatively coupled to the network orchestrator.

In block 304, an indication is received at the network orchestrator that a branch gateway has joined the SD-WAN, including identifying information. In some examples, the identifying information includes a public IP address of the branch gateway. The indication may be transmitted to the network orchestrator by an initialization service that is communicatively coupled to the network orchestrator.

In block 306, a geographic location of the first headend gateway that is located in a first geographic region is determined based on the identifying information of the first headend gateway. In some examples, the network orchestrator sends portions of the identifying information, including a public IP address, to a location determination service, and receives, in response, the geographic location of the first headend gateway.

In block 308, a geographic location of the branch gateway that is located in the first geographic region is determined based on the identifying information of the branch gateway. In some examples, the network orchestrator sends portions of the identifying information, including a public IP address, to a location determination service, and receives, in response, the geographic location of the branch gateway.

In block 310, a set of headend gateways located in the first geographic region is selection, including the first headend gateway. The set of headend gateways may be located within a close enough proximity to the branch gateway by virtue of being in the first geographic region that they are each potentially the most suitable headend gateway to assign the branch gateway. The set of headend gateways may be selected from a master list of headend gateways maintained on the network orchestrator. Associated with each headend gateway in the master list may be geographic location information and identifying information previously collected by the network orchestrator, as well as operating information.

In block 312, suitability scores are calculated for each headend gateway of the set of headend gateways based on weighted parameters. In some examples, the suitability score is a sum of weighted parameters including headend gateway available capacity (including, for example, CPU usage and number of active sessions with other gateways), link health between the branch gateway and the respective headend gateway, and geographic distance between the geographic location of the headend gateway and the geographic location of the branch gateway.

In block 314, each headend gateway of the set of headend gateways is ranked is ranked based on its suitability score. Each new branch gateway may have a different ranking of headend gateways depending on the dynamic loading of each headend gateway at the time of the branch gateway joining the SD-WAN, link health between each headend gateway and that specific branch gateway, and geographic location of that specific branch gateway.

In block 316, the branch gateway is assigned to the highest ranked headend gateway. In some examples, the network orchestrator sends commands to the SD-WAN that cause the branch gateway to be assigned to the highest ranked headend gateway.

Figure 4:
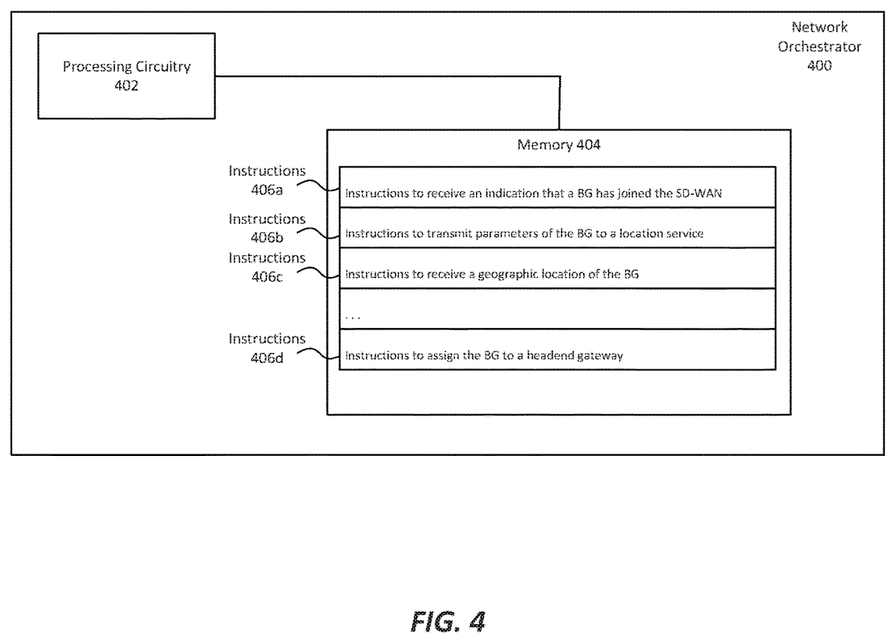
FIG. 4 illustrates an example network orchestrator including instructions for automatic gateway selection.

FIG. 4 illustrates an example network orchestrator including instructions for automatic gateway selection. Although network orchestrator 400 is shown in FIG. 4 as a computing device, it is contemplated that a network orchestrator consistent with this disclosure could take many forms, including a cloud service, a network service, etc.

Network orchestrator 400 includes processing circuitry 402 and memory 404. Memory 404 includes instructions 406. Instructions 406 may be executed on processing circuitry 402 to cause network orchestrator 400 to perform various actions.

For example, instructions 406a cause network orchestrator 400 to receive an indication that a branch gateway has joined a SD-WAN. Instructions 406b cause network orchestrator 400 to transmit parameters of the branch gateway to a location service. Instructions 406c cause network orchestrator 400 to receive a geographic location of the branch gateway from the location service. Instructions 406d cause network orchestrator 400 to assign the branch gateway to a headend gateway.

As noted by the ellipses in FIG. 4, additional instructions 406 may be stored in memory 404 to cause network orchestrator 400 to perform additional actions when those instructions 406 are executed by processing circuitry 402.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" can often describe both the classification of packets to a flow pattern, as well as the path those classified packets take through the SDN overlay network. "Routes" more often refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection. Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc.

The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network orchestrator of a software defined wide area network (SD-WAN), comprising:
   processing circuitry; and
   a memory including instructions that, when executed by the processing circuitry, cause the network orchestrator to:
     receive an indication that a branch gateway has joined the SD-WAN, including an IP address;
     determine, based on parameters of the branch gateway, including the IP address, a geographic location of the branch gateway;
     select a set of headend gateways located in a region including the geographic location of the branch gateway;
     calculate a suitability score for each headend gateway of the set of headend gateways, wherein the suitability score is based, in part, on the geographic location of the branch gateway in comparison to a geographic location of the each headend gateway;
     rank each headend gateway of the set of headend gateways based on its suitability score; and
     assign the branch gateway to a headend gateway of the set of headend gateways with an optimal suitability score.

2. The network orchestrator of claim 1, wherein the indication that the branch gateway had joined the SD-WAN is a message from the branch gateway including IP address, MAC address, and other identifying information.

3. The network orchestrator of claim 1, wherein the set of headend gateways are selected from a list of headend gateways of the SD-WAN maintained on the network orchestrator.

4. The network orchestrator of claim 3, wherein each headend gateway of the list of headend gateways includes identifying information and geographic location information.

5. The network orchestrator of claim 1, wherein the instructions further cause the network orchestrator to receive link health information for links between the branch gateway and each of the set of headend gateways, respectively.

6. The network orchestrator of claim 5, wherein each suitability score includes weighted metrics for the respective headend gateway, including one or more of: headend gateway used CPU percentage, a number of active sessions, and the link health information.

7. A method, comprising:
- receiving, at a network orchestrator of a software defined wide area network (SD-WAN), an indication that a first headend gateway has joined the SD-WAN, including identifying information;
- receiving, at the network orchestrator, an indication that a branch gateway has joined the SD-WAN, including identifying information;
- determining, based on the identifying information of the first headend gateway, a geographic location of the first headend gateway that is located in a first geographic region;
- determining, based on the identifying information of the branch gateway, a geographic location of the branch gateway that is located in the first geographic region;
- selecting a set of headend gateways located in the first geographic region, including the first headend gateway;
- calculating suitability scores for each headend gateway of the set of headend gateways based on weighted parameters including at least one of: geographical nearness to the branch gateway, capacity of the each headend gateway, link health information between the each headend gateway and the branch gateway, and dynamic loading of the each headend gateway; and
- ranking each headend gateway of the set of headend gateways based on its suitability score.

8. The method of claim 7, wherein the identifying information of the branch gateway and the identifying information of the headend gateway each include at least one of: an IP address and a MAC address.

9. The method of claim 8, further comprising transmitting the IP address of the branch gateway to a location determination service and receiving a geographic location of the branch gateway, including a first geographic region.

10. The method of claim 7, further comprising receiving, at the network orchestrator, the link health information for links between the branch gateway and each of the set of headend gateways, respectively.

11. The method of claim 7, wherein a weight of each weighted parameter of each suitability score is adjustable by a network administrator.

12. The method of claim 7, wherein the set of headend gateways are selected from a list of headend gateways of the SD-WAN maintained on the network orchestrator.

13. The method of claim 12, further comprising periodically receiving gateway health information from each of the list of headend gateways of the SD-WAN.

14. The method of claim 7, wherein the highest ranking headend gateway is selected to be paired with the branch gateway.

15. The method of claim 7, wherein a network administrator selects a preferred headend gateway to be paired with the branch gateway from the ranked headend gateways.

16. A non-transitory, computer-readable medium including instructions that, when executed, cause a device to:
- receive an indication that a branch gateway has joined a software defined wide area network (SD-WAN), including an IP address, a MAC address, and other identifying information;
- transmit, to a location determination service, parameters of the branch gateway, including the IP address;
- receive, from the location determination service, a geographic location of the branch gateway, including a first geographic region;
- select, from a list of headend gateways of the SD-WAN, a set of headend gateways located in the first geographic region;
- receive, from the branch gateway, link health information for links between the branch gateway and each of the set of headend gateways, respectively;
- calculate a suitability score for each headend gateway of the set of headend gateways, wherein the suitability score is based on weighted parameters including at least one of:
- geographical nearness to the branch gateway, capacity of the each headend gateway, link homogeneity, the link health information, and dynamic loading of the each headend gateway;
- rank each headend gateway of the set of headend gateways based on its suitability score; and
- assign the branch gateway to a headend gateway of the set of headend gateways with an optimum suitability score.

17. The medium of claim 16, wherein the location determination service is a cloud service.

18. The medium of claim 16, wherein link health information includes latency between the branch gateway and the respective headend gateway, and jitter between the branch gateway and the respective headend gateway.

19. The medium of claim 16, wherein a weight of each weighted parameter of each suitability score is adjustable by a network administrator.

20. The medium of claim 19, wherein the weight of each weighted parameter is adjustable by a machine learning algorithm.

* * * * *